United States Patent [19]
Bodin et al.

[11] Patent Number: 5,507,034
[45] Date of Patent: Apr. 9, 1996

[54] CHANNEL SELECTION IN A CELLULAR COMMUNICATION SYSTEM

[75] Inventors: Roland Bodin, Spånga; Harald Kallin, Sollentuna; Lars M. Lindroth, Stockholm; Walter Ghisler, Upplands Väsby, all of Sweden

[73] Assignee: Telefonaktiebolaget LM Ericsson, Stockholm, Sweden

[21] Appl. No.: 114,347

[22] Filed: Sep. 1, 1993

[51] Int. Cl.$^6$ .................................................. H04Q 7/38
[52] U.S. Cl. .................... 455/34.1; 455/33.1; 455/34.2; 455/62
[58] Field of Search .................... 455/33.1, 33.2, 455/33.3, 33.4, 34.1, 34.2, 54.1, 56.1, 62, 63, 58.1; 379/59, 60; 370/95.3, 77, 95.1

[56] References Cited

U.S. PATENT DOCUMENTS

| | | | |
|---|---|---|---|
| 4,144,411 | 3/1979 | Frenkiel | 179/2 |
| 4,747,101 | 5/1988 | Akaiwa et al. | 455/34.1 |
| 4,914,649 | 4/1990 | Schwendeman et al. | 455/34.1 |
| 5,038,399 | 8/1991 | Bruckert | 455/33 |
| 5,073,971 | 12/1991 | Schaeffer | 455/33 |
| 5,197,093 | 3/1993 | Knuth et al. | 455/34.1 |

FOREIGN PATENT DOCUMENTS

| | | |
|---|---|---|
| 0202485 | 11/1986 | European Pat. Off. |
| 0329997 | 8/1989 | European Pat. Off. |
| 0441372 | 8/1991 | European Pat. Off. |
| 0466139 | 1/1992 | European Pat. Off. |
| 61-54725 | 3/1986 | Japan |
| 0103525 | 5/1988 | Japan ................. 455/34.1 |
| 63-180229 | 7/1988 | Japan |
| 4124920 | 4/1992 | Japan ................. 455/34.1 |
| 2249922 | 5/1992 | United Kingdom |

*Primary Examiner*—Reinhard J. Eisenzopf
*Assistant Examiner*—Nguyen Vo
*Attorney, Agent, or Firm*—Burns, Doane, Swecker & Mathis

[57] ABSTRACT

A method in a cellular communication system provides selection of a channel for use in a pending communications operation, the selection reducing the likelihood of co-channel interference. In each co-channel cell, frequencies from the cell's frequency group are ordered in a sequence. A different frequency in each cell is designated as having a highest priority. Successively lower priorities are then assigned, in each cell, to remaining frequencies in sequence. Then, in each cell, selection is made by identifying the available frequency having the highest priority. The method may be modified to provide for even distribution of hardware use by changing the priorities in each cell periodically. The method may also be modified for use in a fully synchronized time division multiple access (TDMA) system by performing the above steps with respect to channels instead of frequencies. The method may further be modified for use in a pseudo-synchronized TDMA system (i.e., one in which the TDMA time slots of one cell are slowly shifting with respect to the time slots of another cell) by selecting, instead of the highest priority channel, one having a lower priority based on a time difference between corresponding time slots in two co-channel cells.

8 Claims, 8 Drawing Sheets

| $C_{11}$ | $C_{21}$ | $C_{31}$ | $C_{41}$ | $C_{51}$ | $C_{61}$ | $C_{71}$ |
|---|---|---|---|---|---|---|
| 1 | 4 | 7 | 10 | 13 | 16 | 19 |
| 2 | 5 | 8 | 11 | 14 | 17 | 20 |
| 3 | 6 | 9 | 12 | 15 | 18 | 21 |
| 6 | 9 | 12 | 15 | 18 | 21 | 3 |
| 9 | 12 | 15 | 18 | 21 | 3 | 6 |
| 12 | 15 | 18 | 21 | 3 | 6 | 9 |
| 15 | 18 | 21 | 3 | 6 | 9 | 12 |
| 18 | 21 | 3 | 6 | 9 | 12 | 15 |
| 21 | 3 | 6 | 9 | 12 | 15 | 18 |
| 5 | 8 | 11 | 14 | 17 | 20 | 2 |
| 8 | 11 | 14 | 17 | 20 | 2 | 5 |
| 11 | 14 | 17 | 20 | 2 | 5 | 8 |
| 14 | 17 | 20 | 2 | 5 | 8 | 11 |
| 17 | 20 | 2 | 5 | 8 | 11 | 14 |
| 20 | 2 | 5 | 8 | 11 | 14 | 17 |
| 4 | 7 | 10 | 13 | 16 | 19 | 1 |
| 7 | 10 | 13 | 16 | 19 | 1 | 4 |
| 10 | 13 | 16 | 19 | 1 | 4 | 7 |
| 13 | 16 | 19 | 1 | 4 | 7 | 10 |
| 16 | 19 | 1 | 4 | 7 | 10 | 13 |
| 19 | 1 | 4 | 7 | 10 | 13 | 16 |

CHANNEL SELECTION IN A CELLULAR COMMUNICATION SYSTEM

BACKGROUND

The invention relates to channel selection in a mobile radio communication system, and more particularly to methods and apparatuses for selecting a channel to be used in a mobile radio communication system cell, the selection being made in a way that reduces the occurrence of co-channel interference.

In a cellular mobile radio communication system, the geographic area served by the system is divided-into geographically defined cells, each of which is serviced by a base station. In the system, there is a finite number of carrier frequencies that are available for use during communications. A frequency group, consisting of a subset of all of the available frequencies, is assigned to each cell for that cell's use during communications. However, because the number of frequency groups is limited, it is necessary to reuse them within the area served by the system. Because the use of a particular frequency by two different cells can result in co-channel interference, possibly reducing the carrier-to-interference ratio below an acceptable quality threshold, an attempt is made to assign frequency groups to cells in a manner that results in any given cell using a different frequency group from its neighbors. A group of cells is called a cluster when the combination of their individually assigned frequency groups includes all available frequencies assigned to the system. There are usually a number of clusters within a system, each repeating a particular frequency allocation, called a reuse pattern.

Cells to which the same frequency group has been allocated are called co-channel cells. It follows from this description that each co-channel cell is assigned to a different cluster from all other co-channel cells.

It is desirable to try to limit the effect of co-channel interference which arises from the simultaneous use of a particular frequency by two different co-channel cells. This can be achieved by assigning frequencies so that the distance between co-channel cells is maximized. However, maximizing this distance means assigning fewer frequencies to each cell. This may conflict with system requirements to increase the capacity of each cell by increasing the number of frequencies assigned thereto.

In a normal reuse pattern, such as the 21-cell frequency repeat pattern, the average expected co-channel interference in a given cell is based on the assumption that all co-channel frequencies in all co-channel cells are used. That is, for a cell having a frequency group $f_A$ containing frequencies $f_1$, $f_{22}$, $f_{43}$, $f_{64}$, ..., the average expected co-channel interference in a given cell is calculated by assuming that each of the cell's frequencies are simultaneously in use by the cell and by the co-channel cells (i.e., those cells to which the same frequency group has been assigned), even though this is often not the case.

Figure 1:
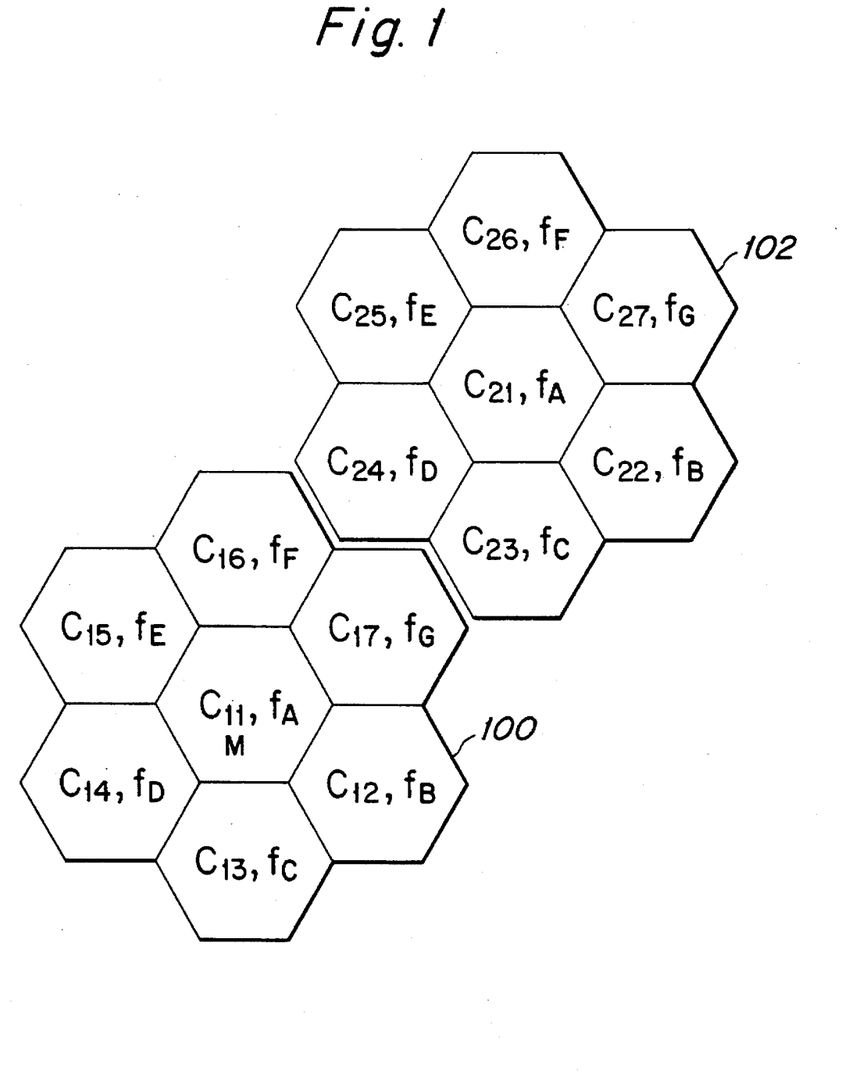
FIG. 1 is a diagram of part of a cellular telephone system utilizing a 7-cell frequency repeat pattern.

For example, reference is made to FIG. 1, which shows a system having a 7-cell frequency repeat pattern. Two cell clusters, each consisting of seven cells, are shown. The first cell cluster 100, consists of cells labeled $C_{11}$, $C_{12}$, $C_{13}$, $C_{14}$, $C_{15}$, $C_{16}$, and $C_{17}$. The second cell cluster 102 consists of cells labeled $C_{21}$, $C_{22}$, $C_{23}$, $C_{24}$, $C_{25}$, $C_{26}$, and $C_{27}$. The showing of only two cell clusters is done here solely for convenience. It should be understood that, in practice, a mobile telephone system may have more than two cell clusters. It should also be understood that the following discussion is not limited to systems having a 7-cell frequency repeat pattern, but is equally applicable to all repeat patterns, including the popular 12-cell and 21-cell frequency repeat patterns.

As shown in FIG. 1, each cell is assigned a frequency group, denoted here as the letter "f" with a letter subscript. For example, each of cells $C_{11}$ and $C_{21}$ has been assigned the frequency group $f_A$.

Specific frequencies are denoted here as the letter f with a numeric subscript. In the 7-cell frequency repeat pattern shown in FIG. 1, frequency group $f_A$ consists of the frequencies $f_1$, $f_8$, $f_{15}$, $f_{22}$ ..., frequency group $f_B$ consists of the frequencies $f_2$, $f_9$, $f_{16}$, $f_{23}$ ..., and so on.

A mobile station, M, in cell $C_{11}$ operates on one of the frequencies in group $f_A$, such as $f_{22}$. The call may or may not experience co-channel interference from another user located in cell $C_{21}$, depending on whether the same frequency, in this case $f_{22}$, is being utilized in cell $C_{21}$.

In high traffic, typically 70–80% of the traffic frequencies, or channels, are in use. If traffic utilization rises higher than 80%, the user's perceived congestion becomes intolerable. It follows that, in high traffic, the probability that a particular channel is simultaneously being used in both cells $C_{11}$ and $C_{21}$ is high. This simultaneous use results in a high expected co-channel interference.

Figure 2:
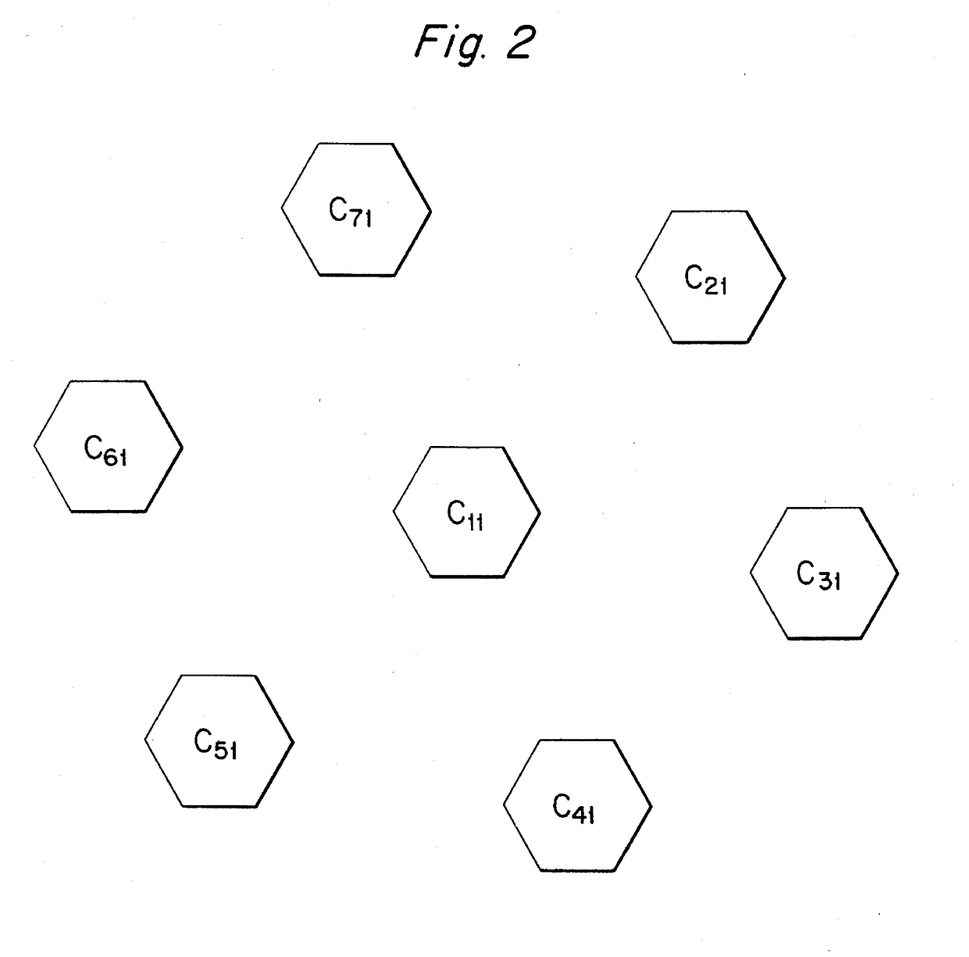
FIG. 2 is a diagram showing a middle cell from a 7-cell cluster, and its six closest co-channel cells.

Referring now to FIG. 2, the middle cell $C_{11}$, first shown in FIG. 1, is illustrated along with its six closest co-channel cells, $C_{21}$, $C_{31}$, $C_{41}$, $C_{51}$, $C_{61}$, and $C_{71}$. It should be understood that each of the illustrated co-channel cells is located at the center of a seven-cell cluster, similar to the first cell cluster 100. However, for simplicity, the remaining cells from each cluster, which are located between those shown, are not illustrated.

As previously stated, each co-channel cell has been assigned the same frequency group. For the sake of convenience in the remainder of this discussion, references made to particular frequencies within a frequency group will assume that the frequencies within the group are numbered sequentially, from 1 to n, where n is an integer. It will also be understood that each particular frequency receives the same numbering assignment in each co-channel cell.

Figure 3:
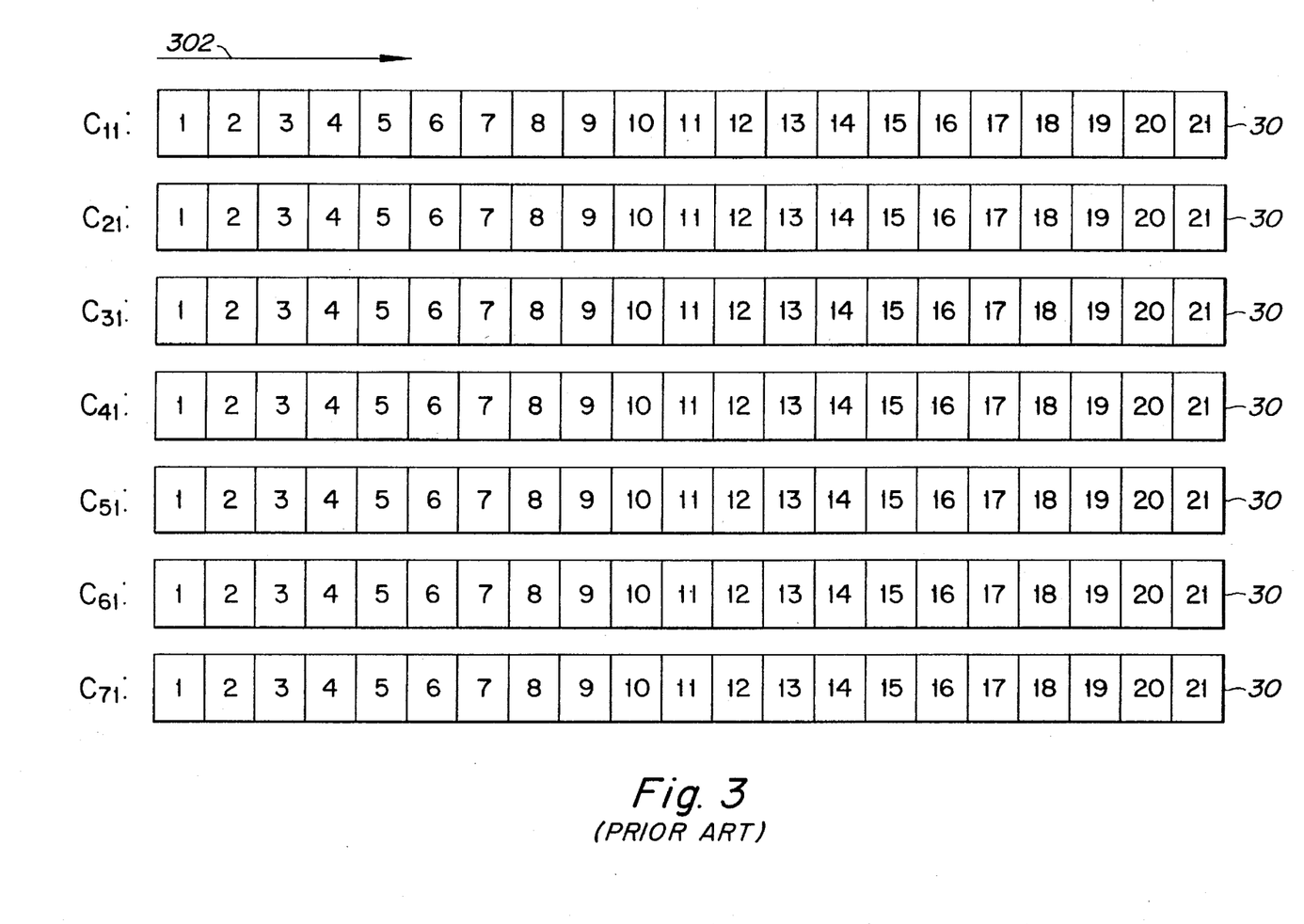
FIG. 3 shows a related method of allocating frequencies in co-channel cells.

FIG. 3 illustrates a method for assigning an available frequency for use within a cell. For the purpose of example, a frequency group 300 is shown which has twenty-one sequentially numbered frequencies. As shown by the arrow 302, frequencies are assigned by taking the leftmost frequency that is available in the list. That is, priority assignments have been made to each of the frequencies, such that priority of selection increases the closer to the left a given frequency is in the list. Consequently, frequency 1 is first investigated to see whether it is available/suitable. If it is not, the search continues to frequency 2, and so on, until an available/suitable frequency is found. If no frequency is found, congestion arises.

In the method described above with reference to FIG. 3, if all cells have the same list and the same algorithm for selecting frequencies, then frequency 1 will often be used and frequency 21 will almost never be used. Consequently, the co-channel interference conditions on frequency 1 will generally be as poor or good as the system is designed for, and frequency 21 will often provide good co-channel interference values in the rare instances in which it is assigned for use by a cell. Thus, even when each cell experiences low traffic, the co-channel interference experienced by the few assigned frequencies will still be high, since the same frequencies are likely to be assigned by each cell.

The reader will recognize that the deficiencies in the method just described are present when each frequency is assigned to only one channel in a system called Frequency Division Multiple Access (FDMA), and also when each frequency is assigned to more than one channel, in a Time Division Multiple Access (TDMA) system.

Therefore, it is an object of the present invention to select frequencies for use in co-channel cells in an FDMA mobile communication system in such a manner that the quality of a connection (as measured by the amount of co-channel interference on a frequency) is improved when the traffic level is less than a maximum capacity.

Another object of the invention is to select frequencies for use in co-channel cells in such a manner that the cell hardware associated with a particular frequency is not unevenly used, relative to the cell hardware associated with other frequencies in the cell.

A further object of the invention is to select frequencies for use in co-channel cells operating in a synchronized TDMA environment in such a manner that the quality of a connection is improved when the traffic level is less than a maximum capacity.

A still further object of the invention is to select channels for use in co-channel cells operating in a synchronized TDMA environment in such a manner that the quality of a connection is improved when the traffic level is less than a maximum capacity.

Yet another object of the invention is to select channels for use in co-channel cells operating in a TDMA environment in an asynchronous state wherein the TDMA structures of co-channel cells are sliding slowly relative to each other and the time differences are known. This state is referred to hereafter as a pseudo-synchronized TDMA environment or simply pseudo-synchronization.

SUMMARY OF THE INVENTION

According to the present invention, the foregoing and other objects are attained by allocating frequency use in a manner that takes advantage of lower average frequency use during periods of lower traffic, such as in off-peak hours.

In accordance with an exemplary FDMA embodiment of the invention, a frequency is selected for use in a pending communications operation by first forming a sequence of frequencies that is the same in all co-channel cells. Next, for each cell, one frequency in the sequence of frequencies is designated to have a highest priority, the designated frequency being different in at least two cells. Then, for each cell, progressively lower priorities are assigned to remaining frequencies by beginning the assigning with a next frequency that follows the designated frequency in the sequence, and continuing to assign in sequence through the list until each of the different frequencies has been assigned a priority. Alternately, the sequence of frequencies in each co-channel cell can be different and arranged in a manner so that the highest priority channels in one co-channel cell are of a relatively low priority in the other co-channel cells. Thus, in each cell, a frequency is selected for use in the pending communications operation by choosing, from the sequence of frequencies, an available frequency having a higher priority than all other available frequencies in the sequence of frequencies.

In accordance with another embodiment of the invention, the above-described steps of, for each cell, designating and assigning are performed periodically, so that the same frequency with the same priority is not designated twice in succession.

In yet another embodiment of the invention, the above-described step of designating is further based on knowledge of current frequency use in the system.

According to another embodiment of the present invention, the sequence of frequencies in the co-channel cells is not the same, but is instead varied based upon the priority usage of frequencies in other co-channel cells. The frequency plan for each co-channel cell can be based on descendingly ranked priority channels for that co-channel cell, followed by channels which are used as priority channels in other co-channel cells listed in an ascending manner.

In still another embodiment, the invention is utilized in a fully synchronized time division multiple access (TDMA) system by forming a sequence of channels that is the same in all co-channel cells. Then, for each cell, one channel in the sequence of channels is designated to have a highest priority, the designated channel being different in at least two cells. Then, for each cell, progressively lower priorities are assigned to remaining channels by beginning the assigning with a next channel that follows the designated channel in the sequence, and continuing to assign in sequence through the list until each of the different channels has been assigned a priority. Finally, in each cell, a channel is selected for use in the pending communications operation by choosing, from the sequence of channels, an unselected channel having a higher priority than all other unselected channels in the sequence of channels.

In yet another embodiment, the invention is adapted for use in a cellular communication system operating in accordance with a pseudo-synchronized time division multiple access CrDMA) system in which a time difference between channels is known, by forming a sequence of channels that is the same in all cells. Then, for each cell, one channel in the sequence of channels is designated to have a highest priority, the designated channel being different in at least two cells. Next, progressively lower priorities are assigned to remaining channels in each cell by beginning the assigning with a next channel that follows the designated channel in the sequence, and continuing to assign in sequence through the list until each of the different channels has been assigned a priority. Then, in each cell, a first unselected channel is identified from the sequence of channels. The first unselected channel has a higher priority than all other unselected channels in the sequence of channels. Finally, an unselected channel is selected for use in the pending communications operation in each cell by selecting a channel having a priority that is alternatively equal to or less than the priority of the first unselected channel in response to a determination that the time difference is greater than a predetermined amount.

BRIEF DESCRIPTION OF THE DRAWINGS

The foregoing objects and features of the present invention will be more readily appreciated upon reading the following detailed description, when read in conjunction with the Figures in which.

DESCRIPTION OF THE PREFERRED EMBODIMENTS.

Figure 4A:
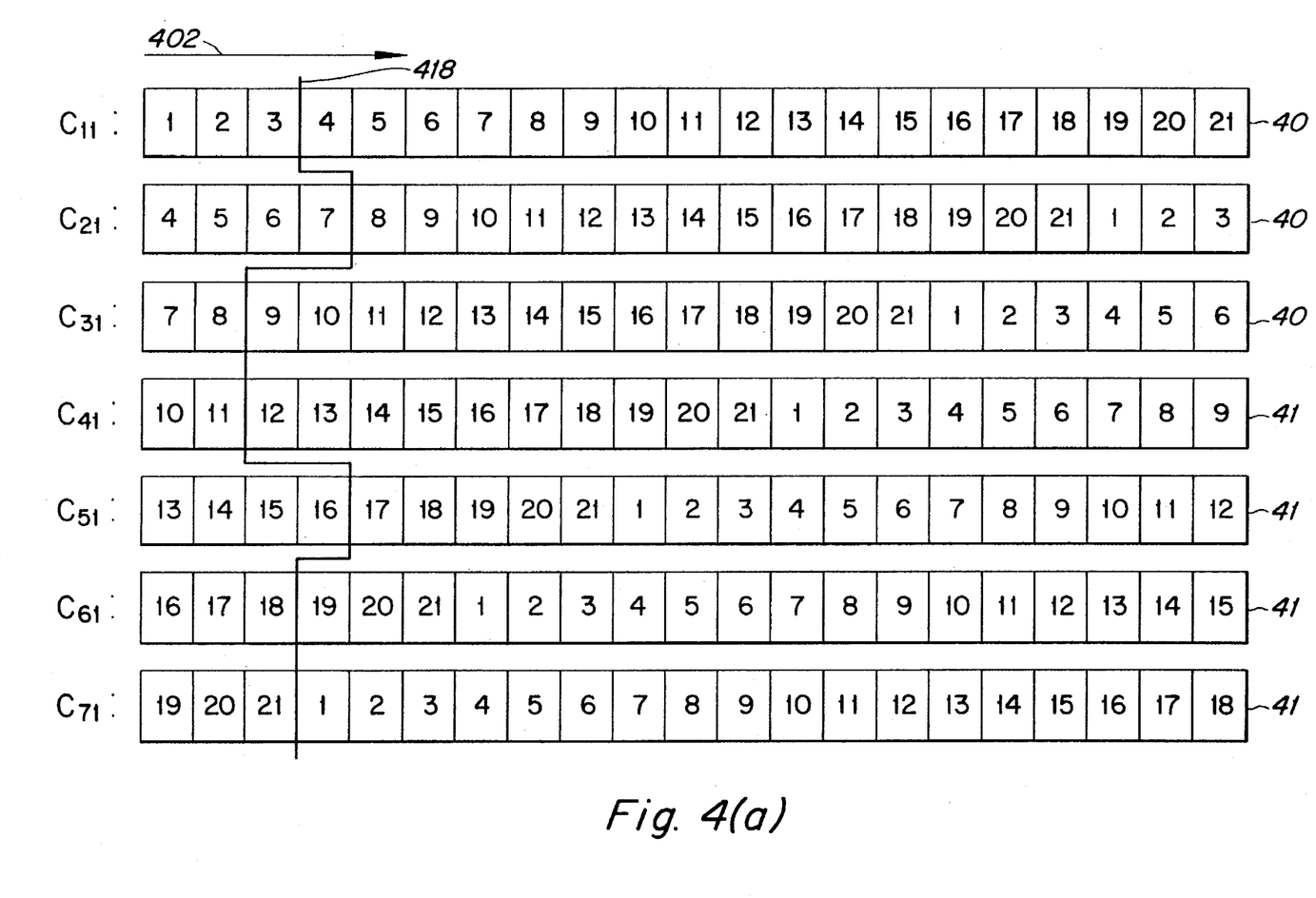
FIG. 4(a) illustrates frequency allocation in seven co-channel cells in an FDMA system in accordance with one exemplary embodiment of the invention.

Referring now to FIG. 4(a), a method in accordance with an exemplary embodiment of the present invention is shown. The arrow 402 indicates that selection of frequency is made by taking the leftmost frequency being available in the list. That is, each frequency has been assigned a priority such that a given frequency's priority of selection increases the closer to the left that frequency is in the list. Consequently, for cell Cn, the selection order 404 requires that frequency 1 be investigated first to determine whether it is available and suitable for use. If it is not, then frequency 2 is investigated, and so on, until a frequency is found that is both available and suitable for use.

This method differs from the conventional method that was described with reference to FIG. 3, in that the selection orders for each of the co-channel cells are no longer identical to one another. Instead, priorities have been assigned in each cell so that, for example, the selection order 404 corresponding to cell $C_{11}$ is the sequence 1, 2, 3, ... 20, 21; the selection order 406 corresponding to cell $C_{21}$ is the sequence 4, 5, 6, ... 21, 1, 2, 3; the selection order 408 corresponding to cell $C_{31}$ is the sequence 7, 8, 9, ... 21, 1, 2, 3, 4, 5, 6; and so forth for the remaining cells having selection orders 410, 412, 414, and 416, as shown in FIG. 4(a). The result is that the frequency that is designated to be investigated first is different for each of the co-channel cells.

The number of frequencies by which each first frequency differs from co-channel cell to co-channel cell is one less than the number of frequencies that would have to be in use in a given cell before any particular frequency can be in use in more than one cell, assuming equal load on all co-channel cells. In the embodiment shown in FIG. 4(a), this offset has been set to 3, but it will be recognized by those skilled in the art that the offset could be set differently to optimize performance in a particular system.

Thus, in the embodiment shown in FIG. 4(a), if each cell carries no more than three calls, then none of the frequencies will be used more than once. This situation corresponds to very low traffic. The more traffic there is, the more frequencies which are used more than once.

The situation in which no cell carries more than three calls is not very likely. A more realistic case is illustrated with the thick vertical line 418 which indicates an average usage of three channels per cell, but with a varying load level per cell. In this case, the frequency corresponding to frequency 7 and frequency 16 are used twice, frequency 9 and ,frequency 12 are unused, and the remaining frequencies are used only once.

Thus, in accordance with this embodiment of the invention, the load would have to approach the maximum of twenty-one channels before co-channel interference would reach the same high values that were obtained using the conventional method previously described with reference to FIG. 3 at low traffic load levels.

Figure 4B:
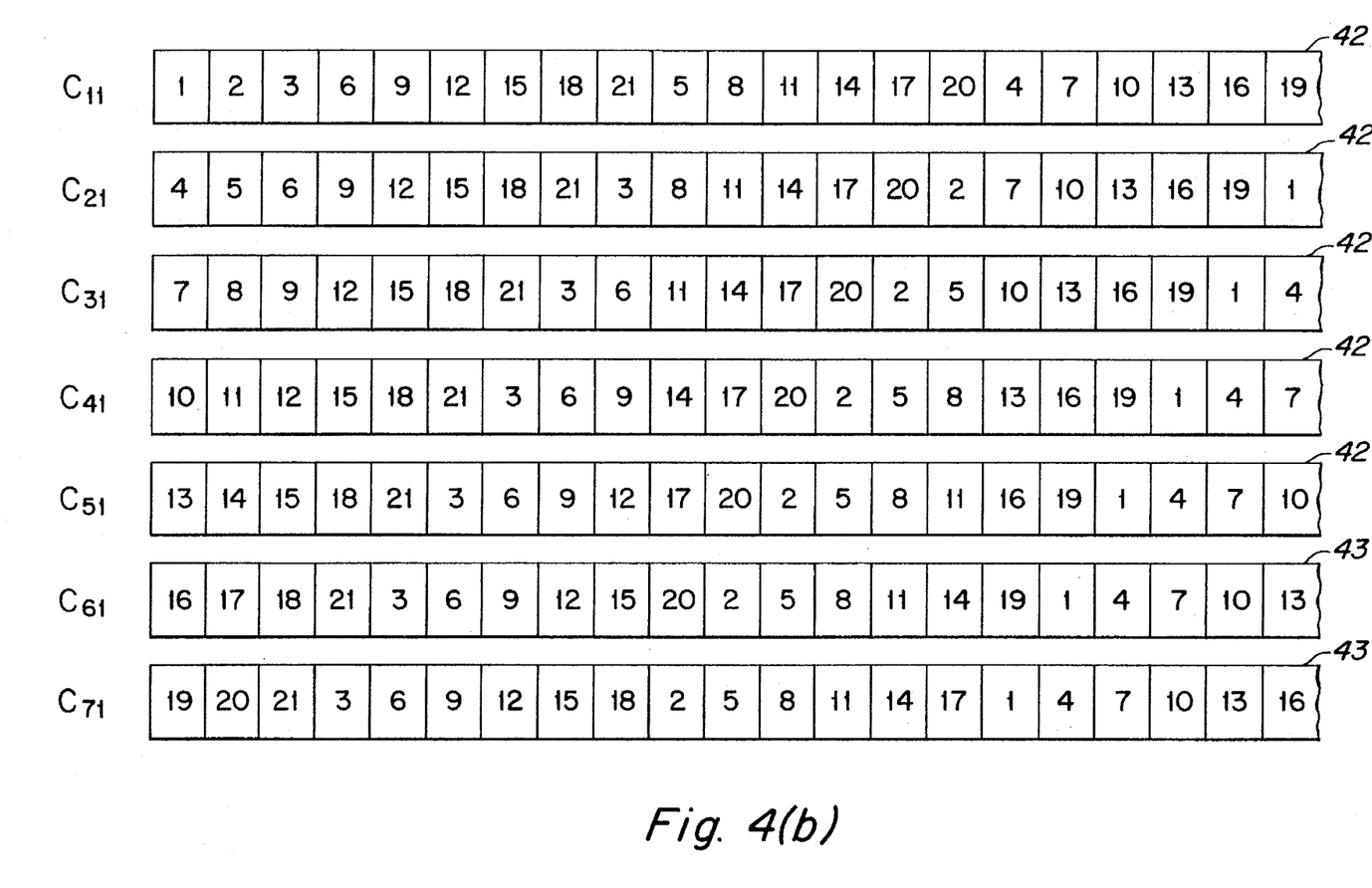
FIG. 4(b) illustrates frequency allocation in seven co-channel cells in an FDMA system in accordance with another exemplary embodiment of the invention.

According to another exemplary embodiment, illustrated in FIG. 4(b), those channels which are assigned to the right of the "priority" channels are assigned in ascending order of their respective priority usage in the channel assignments of other co-channel cells. Thus, for example, in cell $C_{11}$ channel 6 is given the fourth highest priority, as compared with channel 4 in the exemplary embodiment of FIG. 4(a), because channel 6 has the third highest priority assignment in cell $C_{21}$.

Accordingly, the sequence 6, 9, 12, 15, 18, and 21 of channel sequence 420 in cell $C_{11}$ corresponds to those channels which have the third highest priority in the other co-channel cells. The ascending order continues with those channels having second highest priority (i.e., 5, 8, 11, 14, 17, and 20), followed by those channels having the highest priority (i.e., 4, 7, 10, 13, 16, and 19) in the other co-channel cells. In this way, co-channel interference will be reduced during lower than maximum capacity usage periods since the channels designated as being of a high priority for one co-channel cell (e.g., channels 1 and 2 in cell $C_{11}$) have relatively low priority in the channel assignment sequences of the other co-channel cells, for example channel assignment sequences 422–432.

Those skilled in the art will appreciate that although the channel assignments have been illustrated in FIG. 4(b) as following cell order, i.e., in cell $C_{11}$ the sequence 5, 8, 11, 14, 17, and 20 corresponds to the second highest priority channel assignment in cells $C_{21}$, $C_{31}$, $C_{41}$, $C_{51}$, $C_{61}$ and $C_{71}$, respectively, that any desired order can be used as long as the channels are assigned in ascending priority order. Thus, in the exemplary embodiment of FIG. 4(b), the order of the channels ranked 4th through 21st in priority can be changed as long as those channels having third highest priority in other co-channel cells have a higher priority than those channels having a second highest priority in other co-channels cells, which in turn have a higher priority than those channels having a highest priority in other co-channel cells.

Moreover, if more than one co-channel cells are served by the same MSC, then the system will know which channels are used for traffic in each of these co-channel cells. This knowledge can be used to further reduce co-channel interference. Suppose, for example, that cells $C_{31}$ and $C_{41}$ are served by the same MSC and channel assignments are made according to the channel assignment scheme shown in FIG. 4(b). Further, suppose that channels 12 and 15 are currently being used for traffic in cell $C_{41}$ and channels 7, 8, and 9 are currently being used for traffic in cell $C_{31}$. If another call is to be established in cell $C_{31}$, the next channel in the list is 12. However, since the system knows that channels 12 and 15 are already in use in cell $C_{41}$, channel 18 will be allocated to the new call instead of channel 15 to reduce the likelihood of co-channel interference. This knowledge of co-channel usage can be used in any of the above-described embodiments whenever such knowledge is available.

The description has, so far, taken the case where each carrier frequency has a single channel assigned to it. Such a system is referred to as a Frequency Division Multiple Access (FDMA) system. Another feature of the present invention is that the improvement described above is still present if one carrier frequency is assigned to carry more than one conversation, such as in a Time Division Multiple Access (TDMA) system, which defines each communication channel as one or more time slots on a particular carrier frequency.

Figure 5:
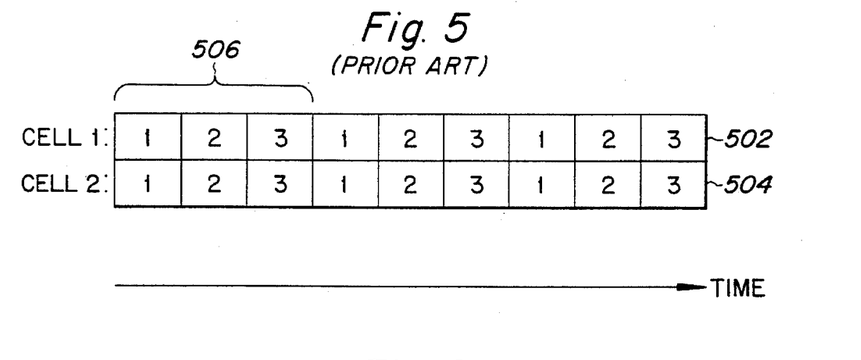
FIG. 5 shows co-channel interference between two cells in a fully synchronized TDMA system.

For example, if each carder frequency is divided into three time slots, then only one carrier is used for every three conversations in each cell. This situation is illustrated in FIG. 5. The three time slots 506 defined by the TDMA system are sequentially repeated over time, as shown. FIG. 5 depicts the situation in which cell 1's carder frequency 502 is the same as, and fully synchronized with, cell 2's carder frequency 504. The result is interference on all three channels.

Figure 6:
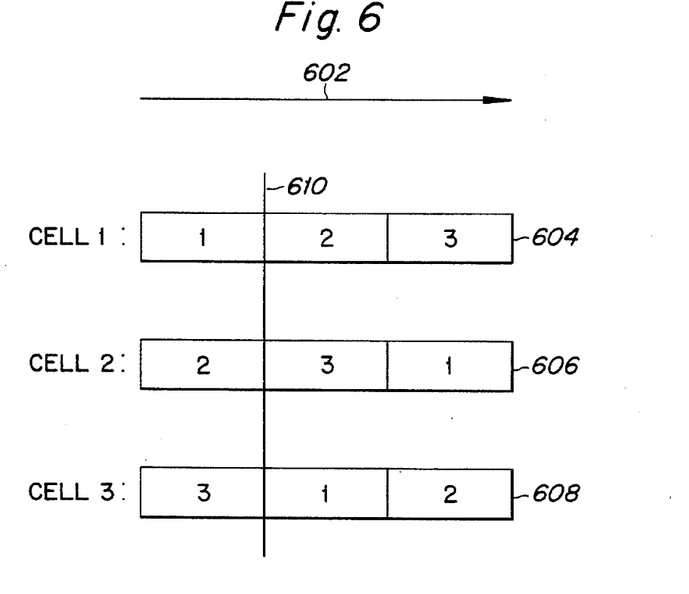
FIG. 6 shows a priority list for use in a three cell fully synchronized TDMA system, in accordance with another exemplary embodiment of the invention.

As described below with respect to FIG. 6, it can be seen that by using the same method described above with respect to FDMA systems, the co-channel interference which arises in the conventional TDMA system described in FIG. 5 can be similarly avoided. This is because the method increases the likelihood that each cell's group of three channels 506 is assigned to a different carder frequency.

In this exemplary embodiment of the invention, priorities are assigned to TDMA time slots on a given frequency (i.e., channels) in a manner that reduces the likelihood of co-channel interference. As shown in FIG. 6, priorities have been assigned to channels in a TDMA system having three time slots per frame on a given frequency. Cell 1's priority list 604 causes it to attempt to allocate a pending communication first to channel 1, then to channel 2, and then to channel 3. Cell 2's priority list 606 causes it to attempt to allocate a pending communication first to channel 2, then to channel 3, and then to channel 1. Similarly, Cell 3's priority list 608 causes it to attempt to allocate a pending communication first to channel 3, then to channel 1, and then to channel 2. The direction of the arrow 602 indicates that if a cell is unable to allocate a pending communication to the highest priority channel, it proceeds to the fight in the list to find the next available one.

The vertical line 610 shows that if only one conversation is taking place on the same frequency in each cell, the cells' differing channel selection eliminates co-channel interference.

Figure 7:
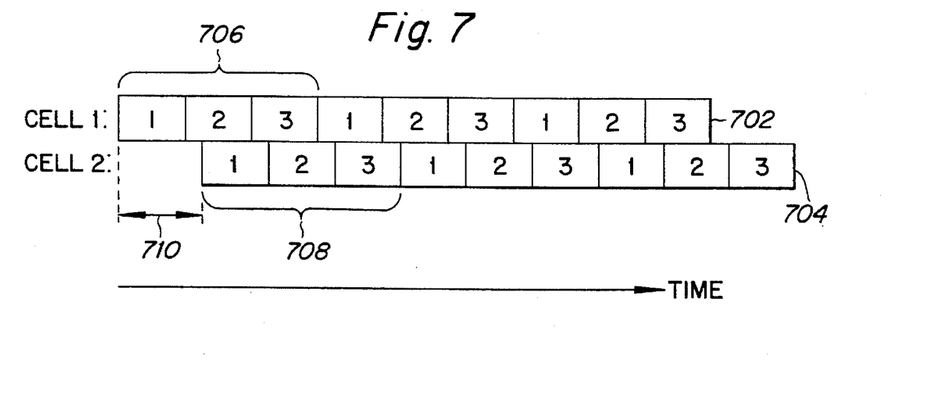
FIG. 7 shows co-channel interference between two cells in a pseudo-synchronized TDMA system.

Sometimes in TDMA systems, inaccuracy in the time reference can cause the TDMA structures to slowly slide relative to one another. In other words, there is a time difference between when a first cell recognizes a given time slot, and when a second cell recognizes that same time slot. This situation, referred to as pseudo-synchronization, is depicted in FIG. 7, where two cells in a TDMA system are both using the same frequency. There, it can be seen that the second cell's carder frequency 704 is shifting to the fight with respect to the first cell's same carder frequency 702, causing its group of three channels 708 to similarly shift with respect to the first three channel group 706.

To compensate for this, in accordance with another exemplary embodiment of the invention, a modified method may be applied to the pseudo-synchronized TDMA situation in order to reduce the likelihood of co-channel interference. The priority of channel selection within a given cell is still made as shown in FIG. 6 and described above with respect to fully synchronized TDMA. However, instead of allocating the first channel that is available and suitable, starting from the left side of the list, this exemplary allocation method also compensates for the time difference 710.

Figure 8:
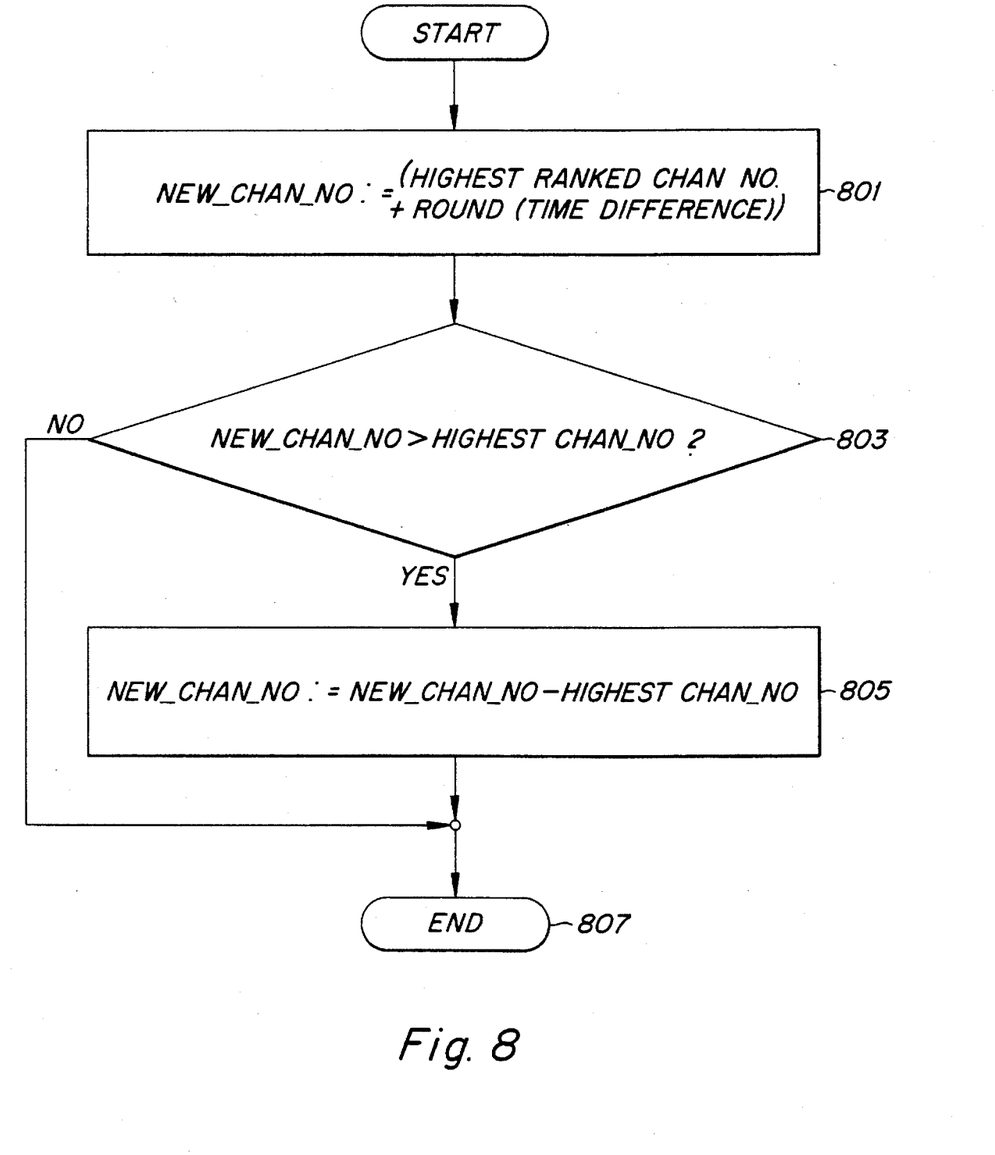
FIG. 8 illustrates channel allocation in accordance with another exemplary embodiment of the invention to be used in a pseudo-synchronized TDMA system.

Referring to FIG. 8, this exemplary method begins at block 801, where a channel is selected that is an integral number of time slots to the right (the rounded off time difference) of the highest ranked channel available in the list. If the result of this addition is a channel number that is within the set of channels assigned to this cell, then the channel is allocated to the pending call and the process ends at block 807.

Otherwise, when the addition of the time difference to the highest ranked channel would result in a channel assignment outside the set of channels assigned to this cell, as determined in block 803, then the channel is instead allocated by subtracting the highest channel number from the channel number determined in block 801. For example, if there are three channels on this carrier frequency assigned to the cell of interest, and the result of processing block 801 is that channel 4 would be assigned, then this would be detected in block 803, and corrected in block 805 so that channel number 1 (i.e., 4–3) would be instead be assigned to the pending call.

Figure 9:
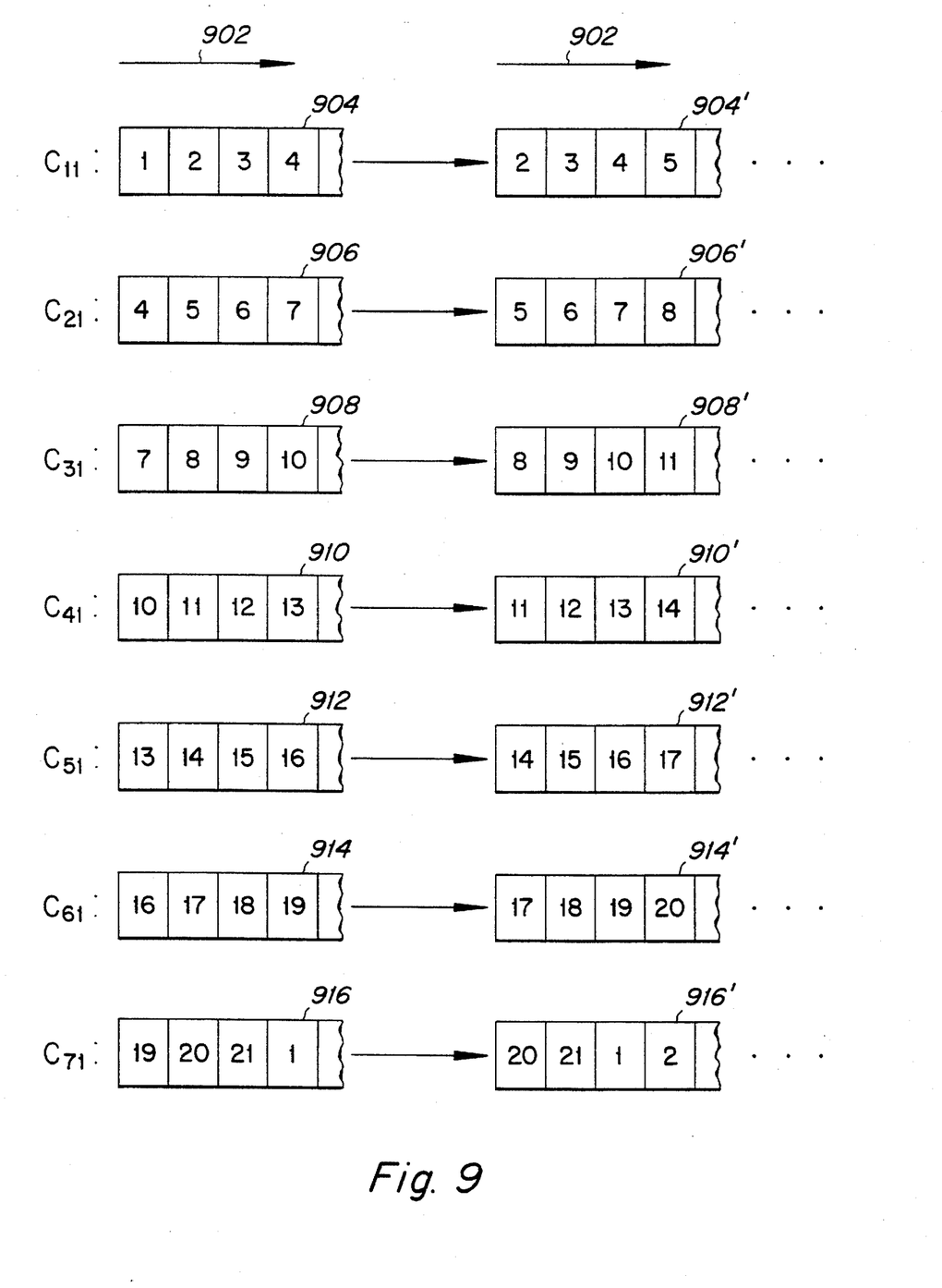
FIG. 9 illustrates another exemplary embodiment of the invention which evenly distributes the allocation of frequency usage in a cell.

Another exemplary embodiment of the invention is shown in FIG. 9, which beneficially avoids uneven burnout of hardware (e.g., output amplifiers) within a cell. Such burnout can result from an unchanging frequency priority assignment, because carrier frequencies having a high priority are selected for use much more often than carrier frequencies having a lower priority. As shown in the figure, each cell uniquely prioritized its sequence of available frequencies as before. However, to avoid uneven burnout of hardware, the priority scheme within each cell can be shifted periodically. For example, one might shift the sequence of each cell by one every night, as shown in FIG. 9. The selection order 904 for cell $C_{11}$ starts out being 1, 2, 3, 4, . . . 20, 21. However, it may be changed overnight, so that the next day the selection order 904' is 2, 3, 4, . . . 20, 21, 1. The other selection orders 906, 908, 910, 912, 914, and 916 may similarly be converted to, respectively, the selection orders 906', 908', 910', 912', 914', and 916'. This shifting operation may continue daily, so that the hardware use will be evenly distributed.

The invention has been described with reference to particular embodiments. However, it will be readily apparent to those skilled in the art that it is possible to embody the invention in specific forms other than those of the preferred embodiments described above. This may be done without departing from the spirit of the invention. The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of selecting a desired communication channel for communication in a cellular radio communication system comprising the steps of:

providing a fixed channel group having a plurality of different channels, which is a subset of a total number of channels available in said radio communication system, to each of a plurality of non-adjacent cells, said plurality of non-adjacent cells is a subset of a total number of cells in said radio communication system;

establishing, for each of said plurality of non-adjacent cells, a fixed selection sequence which prioritizes said plurality of different channels;

designating, in each fixed selection sequence, a set of high priority channels arranged in descending priority order which are different for each of said plurality of non-adjacent cells;

providing a plurality of lower priority channels in each said selection sequence following said set of high priority channels, said lower priority channels of each cell comprising channels found in the sets of high priority channels of the other of said plurality of non-adjacent cells;

ranking a group of said plurality of lower priority channels in each said selection sequence according to ascending priority of said group in a same set of high priority channels of another non-adjacent cell; and selecting, in one of said plurality of non-adjacent cells, a communication channel which is currently unused in said one of said plurality of non-adjacent cells having a highest priority as said desired communication channel.

2. The method of selecting a communication channel of claim 1, wherein said step of selecting further comprises the steps of:

determining whether said highest priority unused channel is being used in another of said plurality of cells, and if said highest priority unused channel is being used in another of said plurality of cells, then selecting the next highest priority channel which is not currently being used in said one of said plurality of cells and which is not currently being used in another of said plurality of cells.

3. The method of selecting a communication channel of claim 2, wherein said step of selecting further comprises the step of:

if all channels which are currently unused in said one of said plurality of cells are currently being used in at least one other of said plurality of cells, then selecting a highest priority unused channel which is used only once in another of said plurality of cells.

4. The method of selecting a communication channel of claim 1 wherein said step of selecting further comprises the step of:

using knowledge in an MSC of communication channel usage in another of said plurality channel.

5. The method of selecting a communication channel of claim 1 wherein said step of grouping further comprises the step of:

grouping each of said lower priority channels according to ascending priority of each of the sets of high priority channels of each of the other non-adjacent cells.

6. In a cellular communication system having a plurality of non-adjacent cells, each non-adjacent cell having a same channel group comprising a plurality of different channels, each channel being usable in each cell in a communications operation, a method of selecting in a cell, from the plurality of different channels, a channel for use in a pending communications operation, comprising the steps of:

in each non-adjacent cell, forming, from the plurality of different channels, a fixed, predetermined sequence of channels;

in each non-adjacent cell, designating a first subset in the sequence of channels to have a highest priority, the designated first subset being different in at least two of said non-adjacent cells;

in each non-adjacent cell, assigning progressively lower priorities to remaining channels, by assigning priority to a group of channels in ascending order relative to their respective priority usage in a same first subset of another of said non-adjacent cells; and in said cell, selecting a channel for use in said pending communications operation by choosing, from the sequence of channels, an unselected channel having a higher priority than all other unselected channels in the sequence of channels.

7. The method of claim 6, wherein said unselected channel is unselected in both said cell and all of said other non-adjacent cells.

8. In a TDMA cellular communication system having a plurality of cells, in which a time difference exists between time slot recognition in said cells, and wherein each cell has a same channel group comprising a plurality of different channels, each channel being usable by each cell in a communications operation, a method of selecting in a cell, from the plurality of different channels, a channel for use in a pending communications operation, comprising the steps of:

in each cell, forming, from the plurality of different channels, a sequence of channels, such that for each channel in the sequence, a next channel is the same in all cells;

in each cell, designating one channel in the sequence of channels to have a highest priority, the designated channel being different in at least two of said cells;

in each cell, assigning progressively lower priorities to remaining channels, by starting with a next channel that follows the designated channel in the sequence of channels, and continuing to assign lower priorities in succession to channels in the sequence of channels until each of the different channels has been assigned a priority;

in each cell, identifying, from the sequence of channels, a first unselected channel having a higher priority than all other unselected channels in the sequence of channels as a successor channel;

in one of said cells, selecting for use in the pending communications operation another unselected channel based upon said time difference.

* * * * *